(12) United States Patent
Schulz-Dobrick et al.

(10) Patent No.: US 10,882,878 B2
(45) Date of Patent: *Jan. 5, 2021

(54) PROCESS FOR PREPARING TRANSITION METAL CARBONATES

(71) Applicant: BASF SE, Ludwigshafen (DE)

(72) Inventors: Martin Schulz-Dobrick, Mannheim (DE); Simon Schroedle, Donauwoerth (DE)

(73) Assignee: BASF SE, Ludwigshafen (DE)

( * ) Notice: Subject to any disclaimer, the term of this patent is extended or adjusted under 35 U.S.C. 154(b) by 64 days.

This patent is subject to a terminal disclaimer.

(21) Appl. No.: 16/225,936

(22) Filed: Dec. 19, 2018

(65) Prior Publication Data

US 2019/0127408 A1 May 2, 2019

Related U.S. Application Data

(62) Division of application No. 13/344,802, filed on Jan. 6, 2012, now abandoned.

(60) Provisional application No. 61/431,076, filed on Jan. 10, 2011.

(51) Int. Cl.
*C07F 19/00* (2006.01)
*C01B 32/90* (2017.01)

(52) U.S. Cl.
CPC ............ *C07F 19/005* (2013.01); *C01B 32/90* (2017.08); *C07F 19/00* (2013.01); *Y10T 428/2982* (2015.01)

(58) Field of Classification Search
None
See application file for complete search history.

(56) References Cited

U.S. PATENT DOCUMENTS

| 2005/0058588 | A1 | 3/2005 | Kang et al. |
| 2006/0239883 | A1 | 10/2006 | Kang et al. |
| 2009/0194746 | A1 | 8/2009 | Nakaoka |
| 2009/0226811 | A1 | 9/2009 | Nakaoka |
| 2010/0196761 | A1 | 8/2010 | Tatsumi et al. |
| 2010/0310869 | A1* | 12/2010 | Jahn ........ C01G 53/00 428/402 |
| 2011/0114900 | A1 | 5/2011 | Nakaoka |
| 2011/0300470 | A1* | 12/2011 | Olbrich ...... H01M 4/9016 429/527 |
| 2011/0315938 | A1 | 12/2011 | Schroedle et al. |

FOREIGN PATENT DOCUMENTS

| EP | 1 189 296 A2 | 3/2002 | |
| JP | 2000-281348 | 10/2000 | |
| JP | 2009-179544 | 8/2009 | |
| WO | WO-2007113102 A2 * | 10/2007 | ............ C01G 53/00 |
| WO | 2009/024424 A2 | 2/2009 | |

OTHER PUBLICATIONS

International Search Report dated Sep. 6, 2012 in PCT/EP2012/050221 (with English Translation of Categories of Cited Documents).

English language translation of CN 101857278 A published Oct. 13, 2010.

* cited by examiner

*Primary Examiner* — Tanisha Diggs
(74) *Attorney, Agent, or Firm* — Oblon, McClelland, Maier & Neustadt, L.L.P.

(57) ABSTRACT

A process for preparing transition metal carbonates with a mean particle diameter in the range from 6 to 19 μm (D50), which comprises combining, in a stirred vessel, at least one solution of at least one transition metal salt with at least one solution of at least one alkali metal carbonate or alkali metal hydrogencarbonate to prepare an aqueous suspension of transition metal carbonate, and, in at least one further compartment, continuously introducing a mechanical power in the range from 50 to 10 000 W/l in a proportion of the suspension in each case, based on the proportion of the suspension, and then recycling the proportion into the stirred vessel.

11 Claims, No Drawings

PROCESS FOR PREPARING TRANSITION METAL CARBONATES

CROSS-REFERENCE TO RELATED APPLICATIONS

This application is a Divisional of U.S. Non-Provisional application Ser. No. 13/344,802, which was filed on Jan. 6, 2012. This application is based upon and claims the benefit of priority to U.S. Provisional Application No. 61/431,076, which was filed on Jan. 10, 2011.

The present invention relates to a process for preparing transition metal carbonates with a mean particle diameter in the range from 6 to 19 μm (D50), which comprises combining, in a stirred vessel, at least one solution of at least one transition metal salt with at least one solution of at least one alkali metal carbonate or alkali metal hydrogencarbonate to prepare an suspension of transition metal carbonate, and, in at least one further compartment, continuously introducing a mechanical power in the range from 50 to 10 000 W/l in a proportion of the suspension in each case, based on the proportion of the suspension, and then recycling the proportion into the stirred vessel.

The present invention further relates to transition metal carbonates in particulate form, which can be prepared, for example, by the process according to the invention.

Secondary batteries, accumulators or rechargeable batteries are just some embodiments by which electrical energy can be stored after generation and used (consumed) when required. Owing to the significantly better power density, there has been a departure in recent times from the water-based secondary batteries and development of batteries in which the charge transport is accomplished by lithium ions.

The electrode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. However, not only the stoichiometry of the electrode material is important, but also other properties such as morphology and surface properties.

Corresponding mixed oxides are prepared generally using a two-stage process. In a first stage, a sparingly soluble salt of the transition metal(s) is prepared by precipitating it from a solution, for example a carbonate or a hydroxide. This sparingly soluble salt is in many cases also referred to as a precursor. In a second stage, the precipitated salt of the transition metal(s) is mixed with a lithium compound, for example $Li_2CO_3$, LiOH or $Li_2O$, and calcined at high temperatures, for example at 600 to 1100° C.

Existing lithium ion batteries still have potential for improvement, especially with regard to the energy density. For this purpose, the cathode material should have a high specific capacity. It is also advantageous when the cathode material can be processed in a simple manner to give electrode layers of thickness from 20 μm to 100 μm, which should have a high density in order to achieve a maximum energy density (per unit volume).

WO 2009/024424 discloses a process for preparing basic transition metal hydroxides, which consists of three steps. These can be characterized as follows:

a) providing at least a first starting solution and a second starting solution,
b) combining at least the first starting solution and the second starting solution in a reactor and producing a homogeneously mixed reaction zone having a specific mechanical power input of at least 2 watts/liter and producing a product suspension comprising insoluble product and a mother liquor which is supersaturated by setting an excess of alkali and has a pH of 10 to 12,
c) partially separating the mother liquor from the precipitated product to set solids contents of at least 150 g/l in the suspension by means of clarification or filtration elements.

However, introduction of relatively large amounts of mechanical energy into large volumes of solutions or suspensions is difficult in terms of apparatus.

It was therefore an object of the present invention to provide batteries which have a maximum energy density per unit volume. More particularly, it was therefore an object of the present invention to provide starting materials for batteries which have a maximum energy density per unit volume. It was a further object of the present invention to provide a process by which suitable starting materials for batteries can be prepared.

Accordingly, the process defined at the outset has been found.

The process described hereinafter for preparation of transition metal carbonates is also referred to in the context of the present invention as process according to the invention for short.

The process according to the invention relates to the preparation of transition metal carbonates. In the context of the present invention, "transition metal carbonates" includes not only stoichiometrically pure transition metal carbonates, but also basic transition metal carbonates and especially compounds which, as well as transition metal ions and carbonate ions, also have anions other than carbonate ions, for example oxide and/or hydroxide ions, and/or cations other than transition metal cations, especially alkali metal ions. Preferred alkali metal ions are potassium and especially sodium ions. The molar portions of anions other than carbonate ions and of cations other than transition metal cations need not be identical.

In one embodiment of the present invention, transition metal carbonate has 0.01 to 45 mol % and preferably 2 to 30 mol % of anions other than carbonate ions, based on the total number of anions in transition metal carbonate.

In one embodiment of the present invention, transition metal carbonate has 4 to 35 mol % and preferably 8 to 20 mol % of hydroxide ions, based on the total number of anions in transition metal carbonate.

In one embodiment of the present invention, transition metal carbonate has 0.01 to 10 mol % and preferably 0.1 to 6 mol % of cations other than transition metal cations, based on the content of transition metal cations.

In one embodiment of the present invention, transition metal is selected from Cr, V, Mn, Ni, Fe, Co, Zn, Ti, Zr and mixtures of one or more of the aforementioned with one another or with alkali metal, aluminum or magnesium, preferably from mixtures of Ni, Mn, Co and optionally one or more further metals selected from alkali metal, aluminum and magnesium.

In one embodiment of the present invention, transition metal carbonate has the general formula (I)

$$M(CO_3)_b O_c (OH)_d A_m B_e X_f \qquad (I)$$

in which the variables are each defined as follows:

M is one or more transition metals, for example Ni, Mn, Co, Fe, Cu, Zn, Ti, Cr, the transition metal(s) preferably being present in the +2 oxidation state, preferably two to four transition metals, more preferably three transition metals, especially combinations of nickel, manganese and cobalt, A is potassium or preferably sodium, B is one or more metals from groups 1 to 3 of the periodic table, excluding sodium and potassium, X is halide, sulfate, phosphate, nitrate or carboxylate, preferably $C_1$-$C_7$-carboxylate, especially benzoate or acetate, b is in the range from 0.75 to 0.98, c is in the range from zero to 0.50, preferably to 0.30, d is in the range from zero to 0.50, preferably to 0.30,
   where the sum of (c+d) is in the range from 0.02 to 0.50, preferably 0.30, e is in the range from zero to 0.1, preferably to 0.05, f is in the range from zero to 0.1, preferably to 0.05, m is in the range from 0.002 to 0.1, preferably to 0.05.

The process according to the invention is performed in a stirred vessel, for example in a batchwise or preferably continuous stirred tank. The stirred tank may have add-ons and/or additions.

The process according to the invention is performed by combining at least one aqueous solution of at least one transition metal salt with at least one aqueous solution of at least one alkali metal carbonate or alkali metal hydrogencarbonate.

In the context of the present invention, aqueous solution of at least one transition metal salt is also referred to as aqueous solution of transition metal salt(s) for short.

Aqueous solution of transition metal salt(s) may comprise at least one transition metal salt, preferably two or three transition metal salts, especially salts of two or three transition metals. Suitable transition metal salts are especially water-soluble salts of transition metal(s), i.e. salts which have a solubility of at least 25 g/l and preferably at least 50 g/l, in distilled water, determined at room temperature. Preferred transition metal salts, especially salts of nickel, cobalt and manganese, are, for example, carboxylic salts, especially acetates, and also sulfates, nitrates, halides, especially bromides or chlorides, of transition metal, the transition metal(s) preferably being present in the +2 oxidation state. Such a solution preferably has a pH in the range from 2 to 7, more preferably in the range from 2.5 to 6.

Suitable transition metals are, for example, the transition metals of the first period, and also zirconium and molybdenum. Preference is given to Cr, V, Ni, Mn, Co, Fe, Zn, Zr, Cr and Ti. Preference is given to selecting mixtures of at least two of the aforementioned transition metals, more preferably of at least three or of at least two of the aforementioned transition metals with magnesium, aluminum or calcium.

In one embodiment of the present invention, transition metal is selected from Cr, V, Ni, Mn, Co, Fe, Zn, Zr, Cr and Ti and mixtures of one or more of the aforementioned transition metals, more preferably of at least three or of at least two of the aforementioned transition metals with magnesium, aluminum or calcium.

In one embodiment of the present invention, it is possible to proceed from an aqueous solution of transition metal salt(s) which comprises, as well as water, one or more organic solvents, for example ethanol, methanol or isopropanol, for example up to 15% by volume, based on water. Another embodiment of the present invention proceeds from an aqueous solution of transition metal salt(s) comprising less than 0.1% by weight, based on water, or preferably no organic solvent.

In one embodiment of the present invention, aqueous solution of transition metal salt(s) used comprises ammonia, ammonium salt or one or more organic amines, for example methylamine or ethylenediamine. Ammonia or organic amines can be added separately, or they can be formed by dissociation of complex salts of transition metal salt in aqueous solution. Aqueous solution of transition metal salt(s) preferably comprises less than 10 mol % of ammonia or organic amine, based on transition metal M. In a particularly preferred embodiment of the present invention, aqueous solution of transition metal salt(s) does not comprise measurable proportions either of ammonia or of organic amine.

Preferred ammonium salts may, for example, be ammonium sulfate and ammonium sulfite.

Aqueous solution of transition metal salt(s) may have an overall concentration of transition metal(s) in the range from 0.01 to 5 mol/l of solution, preferably 1 to 3 mol/l of solution.

In one embodiment of the present invention, the molar ratio of transition metals in aqueous solution of transition metal salt(s) is adjusted to the desired stoichiometry in the cathode material or mixed transition metal oxide. It may be necessary to take into account the fact that the solubilities of different transition metal carbonates can be different.

Aqueous solution of transition metal salt(s) may comprise, as well as the counterions of the transition metal salt(s), one or more further salts. These are preferably those salts which do not form sparingly soluble salts with M, or hydrogencarbonates of, for example, sodium, potassium, magnesium or calcium, which can cause precipitation of carbonates in the event of pH alteration.

In another embodiment of the present invention, aqueous solution of transition metal salt(s) does not comprise any further salts.

In one embodiment of the present invention, aqueous solution of transition metal salt(s) may comprise one or more additives which may be selected from biocides, complexing agents, for example ammonia, chelating agents, surfactants, reducing agents, carboxylic acids and buffers. In another embodiment of the present invention, aqueous solution of transition metal salt(s) does not comprise any additives.

Examples of suitable reducing agents which may be in aqueous solution of transition metal salt(s) are sulfites, especially sodium sulfite, sodium hydrogensulfite, potassium sulfite, potassium bisulfite, ammonium sulfite, and also hydrazine and salts of hydrazine, for example the hydrogensulfate, and also water-soluble organic reducing agents, for example ascorbic acid or aldehydes.

Combination is effected with aqueous solution of at least one alkali metal hydrogencarbonate or preferably of at least one alkali metal carbonate, for example by addition of solution of alkali metal (hydrogen)carbonate to aqueous solution of transition metal salt(s). Particularly preferred alkali metal carbonates are sodium carbonate and potassium carbonate, and also ammonium carbonate. Particularly preferred alkali metal hydrogencarbonates are potassium hydrogencarbonate and ammonium hydrogencarbonate.

In one embodiment of the present invention, the precipitation is brought about by addition of an aqueous solution of sodium carbonate or potassium carbonate to an aqueous solution of acetates, sulfates or nitrates of transition metal(s).

Aqueous solution of alkali metal (hydrogen)carbonate may have a concentration of carbonate in the range from 0.1 to 3 mol/l, preferably 1 to 2.5 mol/l. It may also comprise hydrogencarbonate.

Aqueous solution of alkali metal (hydrogen)carbonate may comprise one or more further salts, for example ammonium salts, especially ammonium hydroxide, ammonium sulfate or ammonium sulfite. In one embodiment, a molar NH$_3$:transition metal ratio of 0.01 to 0.9 and more preferably of 0.02 to 0.2 can be established.

The combination can be executed in one or more steps, in each case continuously or batchwise. For instance, solution of alkali metal (hydrogen)carbonate can be fed into the stirred vessel via one or more feed points, and in such a way that the particular feed point is above or below the liquid level. More particularly, metered addition can be effected into the vortex generated by the stirrer in a stirred tank. For instance, it is additionally possible to meter aqueous solution of transition metal salt(s) into the stirred vessel via one or more feed points, and in such a way that the particular feed point is above or below the liquid level. More particularly, metered addition can be effected exactly into the vortex generated by the stirrer in a stirred tank.

In one embodiment of the present invention, solution of alkali metal (hydrogen)carbonate is at least partly metered directly into the separate compartment via one or more feed points.

In one embodiment of the present invention, solution of transition metal salt(s) is at least partly metered directly into the separate compartment via one or more feed points.

In a particular embodiment, the solution(s) of alkali metal (hydrogen)carbonate and/or transition metal salt(s) are introduced exclusively directly into the separate compartment.

In one embodiment of the present invention, the procedure is to feed an aqueous solution of alkali metal (hydrogen)carbonate into the stirred vessel with several aqueous solutions of one transition metal salt each, each via separate feed points. In another embodiment of the present invention, the combining is performed in such a way that an aqueous solution of alkali metal (hydrogen)carbonate is fed into the stirred vessel with an aqueous solution comprising all transition metals desired for performance of the process according to the invention as salts, each via separate feed points. The latter procedure has the advantage that inhomogeneities in the concentration ratios of the different transition metals can be more easily avoided.

The combination of aqueous solution of transition metal salt(s) with at least one solution of alkali metal (hydrogen) carbonate produces an aqueous suspension of transition metal carbonate since the transition metal carbonate precipitates out. The aqueous continuous phase, which is also called mother liquor in the context of the present invention, comprises water-soluble salts and optionally further additives present in solution. Examples of possible water-soluble salts include alkali metal salts of the counterions of transition metal, for example sodium acetate, potassium acetate, sodium sulfate, potassium sulfate, sodium nitrate, potassium nitrate, sodium halide, potassium halide, including the corresponding ammonium salts, for example ammonium nitrate, ammonium sulfate and/or ammonium halide. Mother liquor most preferably comprises sodium chloride, potassium chloride or ammonium chloride. Mother liquor may further comprise additional salts, any additives used and any excess alkali metal (hydrogen)carbonate, and also unprecipitated transition metal in the form of transition metal salt.

The pH of the mother liquor is preferably in the range from 7 to 10, more preferably in the range from 7.5 to 9.0.

It has now been found that the morphology and the surface properties of mixed transition metal oxides can be influenced not only in the calcination stage, but also in the stage of production of the precursor. It has been found that the morphology can be controlled by introducing greater amounts of mechanical power. Introduction of greater amounts of mechanical energy into greater volumes is, however, difficult in apparatus terms. To overcome these difficulties, a mechanical power in the range from 50 to 10 000 W/l, preferably 200 to 2500 W/l and more preferably to 500 W/l (watts per liter) is introduced continuously in a proportion of the suspension in each case in at least one further compartment, based on the proportion of the suspension, and then the proportion is returned to the stirred vessel.

The further compartment selected may comprise pumps, inserts, mixing units, wet grinders, homogenizers and stirred tanks, stirred tanks selected as the further compartments preferably having a much smaller volume than the stirred vessel described at the outset. Further compartment preferably has a volume in the range from 0.01 to 20% by volume of the stirred vessel described at the outset.

Examples of particularly suitable pumps are centrifugal pumps and peripheral wheel pumps.

A further compartment used may be a separate vessel, or an insert in the stirred vessel. Inserts are understood to mean those plant parts which are within the volume of the actual stirred vessel but are delimited in terms of construction and have a dedicated mixing unit. For example, the insert selected may be a pipe which is immersed into the stirred vessel and the reaction mixture and is mixed with the aid of a further stirrer, for example of a stirrer with propellers. This creates a compartment in the stirred vessel. The proportion of the compartment volume to the total volume is 0.1 to 20% by volume, preferably 0.1 to 10% by volume. In one variant, several such compartments may be present, which are of identical or different size.

"Continuously introduce" is understood to mean that several small volumes of suspension formed are drawn off at relatively brief intervals during the performance of the precipitation, or a certain substream of suspension formed is constantly drawn off from the stirred vessel, mechanical energy is introduced and then the proportion in question is recycled (returned) to the stirred vessel.

Mechanical energy can be introduced in a stirred tank, for example, by vigorous stirring. Such stirring is much simpler than in a (large) stirred vessel.

In one variant of the present invention, mechanical energy can be introduced at least partly by means of ultrasound.

Smaller volumes may amount to up to 0.1 to 10% of the stirred vessel described at the outset, for example in the case of stirred tanks, but also less in the case of pumps or wet grinders, for example 0.01 to 0.099%.

In one embodiment of the present invention, a further compartment, for example a further vessel, has been added onto the stirred vessel; for example, it has been connected to the stirred vessel via a pumped circulation system. In another embodiment of the present invention, two or more separate vessels connected to the stirred vessel via one or more pump circulation systems have been added on to the stirred vessel.

A "pumped circulation system" is preferably understood to mean an apparatus which continuously withdraws a portion of the reactor contents from the reactor, supplies it to a separate vessel and, after flow through the separate vessel, returns it back to the reactor. The flow is maintained by using at least one pump. In a particular embodiment, elements present in the separate vessel may have a pumping action, such that it is possible to work without a separate pump.

In one embodiment of the present invention, in the course of performance of the process according to the invention, a mean power in the range from 2 to 35 W/l and preferably 8 to 20 W/l is introduced, based on overall suspension.

In one embodiment of the present invention, in the course of performance of the process according to the invention, a mean power in the range from 2 to 25 W/l and preferably 3 to 17 W/l is introduced, based on overall suspension.

In one embodiment of the present invention, 20 to 80% of the mechanical power is introduced in the further compartment, preferably at least 30%, more preferably at least 40%.

In one embodiment of the present invention, the process according to the invention can be performed at a temperature in the range from 20 to 90° C., preferably 30 to 80° C. and more preferably 35 to 75° C. The temperature is determined in the stirred vessel. The temperature in the further compartment(s) may differ from the temperature in the stirred vessel.

The process according to the invention can be performed under air, under inert gas atmosphere, for example under noble gas or nitrogen atmosphere, or under reducing atmosphere. Examples of reducing gases include, for example, CO and $SO_2$. Preference is given to working under inert gas atmosphere.

The process according to the invention can be performed at any pressure, provided that the pressure is not below the vapor pressure of aqueous solution or suspension. Suitable examples are 1 to 10 bar, preference being given to standard pressure.

In one embodiment of the present invention, a mean solids content in the range from 70 to 1000 g/l is employed, determined in the stirred vessel, preferably 150 to 500 g/l.

In one embodiment of the present invention, a mean residence time in the stirred vessel in the range from 2 to 18 hours and preferably 4 to 14 hours is employed.

In one embodiment of the present invention, a mean residence time in the further vessel within a range from 0.01 to 0.5 second and preferably 0.2 second is employed.

In one embodiment of the present invention, the mean residence time in the further vessel corresponds to one thousandth or less of the mean residence time in the stirred vessel, but at least one millionth.

The process according to the invention can be performed in the steady state or in the non-steady state, preference being given to a steady state, also called a steady operating mode.

Transition metal carbonate prepared by the process according to the invention is obtained with a very good morphology. For instance, it has a mean particle diameter (D50) in the range from 6 to 16 µm, especially 7 to 16 µm. The mean particle diameter (D50) in the context of the present invention refers to the median of the volume-based particle diameter, as can be determined by light scattering, for example.

In one embodiment of the present invention, precipitated transition metal carbonate is separated from the mother liquor. The term "mother liquor" is explained above.

When the separation is performed continuously, a representative proportion of the suspension formed can be taken from the reaction vessel in each case, i.e., for example, an aliquot in each case, or a nonrepresentative proportion. For example, it is possible to separately draw off mother liquor in the course of removal from the reaction vessel. It is also possible to preferentially withdraw transition metal carbonate with particular particle sizes in the course of withdrawal from the reaction vessel. The two latter embodiments generally lead to performance of the reaction in a non-steady operating mode.

The separation can be effected, for example, by filtration, centrifugation, decantation, spray drying or sedimentation, or by a combination of two or more of the aforementioned operations. Examples of apparatuses are filter presses, belt filters, hydrocyclones, inclined plate clarifiers, or combinations of the aforementioned apparatuses.

The removal can—especially when the separation is performed by filtration, be followed by one or more wash steps. For example, it is possible to wash with pure water or with an aqueous solution of alkali metal carbonate or alkali metal hydroxide, especially with an aqueous solution of sodium carbonate, potassium carbonate, sodium hydroxide, potassium hydroxide, lithium hydroxide or ammonia. Water is preferred.

Wash step(s) can be effected, for example, using elevated pressure or elevated temperature, for example 30 to 50° C. In another variant, wash step(s) is/are performed at room temperature.

The efficiency of the wash steps can be checked by analytical measures. For example, it is possible to analyze the content of transition metal(s) M in the wash water.

In the case that washing is effected with water instead of with an aqueous solution of alkali metal carbonate, it is possible with the aid of conductivity tests on the washing water to check whether water-soluble substances, for example water-soluble salts, can still be washed out.

The separation can be followed by one or more drying steps. Drying step(s) can be performed at room temperature or at elevated temperature. For example, it is possible to dry at temperatures in the range from 30 to 150° C.

Drying step(s) can be performed at standard pressure or under reduced pressure, for example at a pressure in the range from 10 mbar to 500 mbar.

In one embodiment of the present invention, precursors prepared by the process according to the invention still comprise physically bound water even after any drying step(s).

In one embodiment of the present invention, the separation is followed by one or more wash steps and optionally one or more drying steps.

Water content and particle diameter of precursor of mixed transition metal oxide are determined after the separation from the mother liquor, preferably after the drying.

In one embodiment of the present invention, particles of transition metal carbonate which have a diameter of more than 20 µm are removed, for example by sieving. If sieving is desired, the sieving is preferably performed after the drying. Preference is given to removing particles of transition metal carbonate which have a diameter of more than 32 µm and more preferably more than 50 µm.

The process according to the invention affords transition metal carbonate in particulate form, also called precursor for short. Precursors produced by the process according to the invention are of very good suitability for production of electrode materials for cathodes for lithium ion batteries.

The present invention further provides transition metal carbonates in particulate form, comprising at least one transition metal carbonate selected from carbonates of Cr, V, Mn, Ni, Fe, Co, Zn, Ti and Zr, wherein the particles are essentially spherical, the proportion of particles with a diameter greater than 50 µm is less than 0.1% by weight, the mean diameter (D50) is in the range from 6 to 19 µm and the ratio of tamped density to mean particle diameter (D50) is greater than 0.08 kg/(l·µm). Such transition metal carbonates in particulate form are also referred to in the context of the present invention as inventive transition metal carbonates for short.

In one embodiment of the present invention, transition metal is selected from Cr, V, Mn, Ni, Fe, Co, Zn, Ti, Zr and mixtures of one or more of the aforementioned with one another or with alkali metal, aluminum or magnesium, preferably from mixtures of Ni, Mn, Co and optionally one or more further metals selected from alkali metal, aluminum and magnesium.

In one embodiment of the present invention, inventive transition metal carbonate has the general formula (I)

$$M(CO_3)_bO_c(OH)_dA_mB_eX_f \qquad (I)$$

in which the variables are each defined as follows:
M is one or more transition metals, for example Ni, Mn, Co, Fe, Cu, Zn, Ti, Cr, preferably two to four transition metals, more preferably three transition metals, especially combinations of nickel, manganese and cobalt,
A is potassium or preferably sodium,
B is one or more metals from groups 1 to 3 of the periodic table, excluding sodium and potassium,
X is halide, for example bromide, preferably chloride, more preferably fluoride, and also sulfate, phosphate, nitrate or carboxylate, preferably $C_1$-$C_7$-carboxylate, especially benzoate or acetate,
b is in the range from 0.75 to 0.98,
c is in the range from zero to 0.50, preferably to 0.30,
d is in the range from zero to 0.50, preferably to 0.30, where the sum of (c+d) is in the range from 0.02 to 0.50, preferably 0.30,
e is in the range from zero to 0.1, preferably to 0.05,
f is in the range from zero to 0.1, preferably to 0.05,
m is in the range from 0.002 to 0.1, preferably to 0.05.

Particles of inventive transition metal carbonate are essentially spherical. This is understood to mean that the particles of transition metal carbonate are essentially ball-shaped.

Inventive transition metal carbonate preferably comprises at least two different transition metals, specifically in the form of cations, especially in the form of cations in the +2 oxidation state. Most preferably, inventive transition metal carbonate comprises mixtures of Ni, Mn, Co, specifically in the form of cations, especially in the form of cations in the +2 oxidation state, and optionally one or more further metals selected from alkali metal, aluminum and magnesium.

"Essentially spherical" includes, for example, also those particles which are not strictly spherical, for example ellipsoidal particles in which the longest semiaxis and the shortest semiaxis differ by not more than 10%. The morphology of transition metal carbonate can be determined by microscopy, for example by light microscopy (LMI) or by scanning electron microscopy (SEM).

"Essentially spherical" also includes those samples of particles which are not strictly spherical in which at least 95% (weight average) of the particles in a representative sample have an essentially spherical shape.

The particle diameter (D50) of inventive transition metal carbonate is in the range from 2 to 25 μm, preferably in the range from 7 to 16 and more preferably to 12 μm. Particle diameter (D50) in the context of the present invention refers to the mean particle diameter (weight average), as can be determined, for example, by light scattering.

In inventive transition metal carbonate, the proportion of particles having a diameter greater than 50 μm is less than 0.1% by weight and preferably 0.001 to 0.05% by weight.

Preferably, in inventive transition metal carbonate, the proportion of particles having a diameter greater than 32 μm is less than 0.1% by weight and preferably 0.001 to 0.05% by weight. More preferably, in inventive transition metal carbonate, the proportion of particles having a diameter greater than 20 μm is less than 0.1% by weight and preferably 0.001 to 0.05% by weight.

In one embodiment of the present invention, particles of inventive transition metal carbonate have a maximum diameter (D99), determined as the volume or weight average, of 50 μm, preferably 32 μm and more preferably 20 μm.

In one embodiment of the present invention, inventive transition metal carbonate has only small proportions of fine dust, for example less than 2% by weight of particles having a diameter of less than 1 μm.

In inventive transition metal carbonate, the ratio of tamped density to mean particle diameter (D50) is in the region above 0.08 kg/(l·μm), preferably at least 0.1 kg/(l·μm).

In one embodiment of the present invention, the tamped density of inventive transition metal carbonate is not more than 2.4 kg/l.

The tamped density can be determined, for example, essentially to DIN 53194 or DIN ISO 787-11, but advantageously with not more than 1250 impacts and with smaller cylinders.

In one embodiment of the present invention, the transition metal cations are distributed within the particles of inventive transition metal carbonate without domain formation.

In one embodiment of the present invention, samples of inventive transition metal carbonate have a homogeneous composition. This is understood to mean that the composition of the individual particles deviates from the mean of the sample by not more than 15 mol %, based on the content of the particular transition metal.

In one embodiment of the present invention, samples of inventive transition metal carbonate do not have any significant proportions of particles which consist essentially of one or more manganese oxides ($Mn_3O_4$, $Mn_2O_3$, $MnO_2$). This is understood to mean that the proportion of these particles in the sample is less than 0.5% by weight and preferably less than 0.05% by weight. The proportion of particles consisting essentially of one or more manganese oxides ($Mn_3O_4$, $Mn_2O_3$, $MnO_2$) is preferably below the detection limit.

In one embodiment of the present invention, samples of inventive transition metal carbonate have an iron content of at most 0.001% by weight. More particularly, the sample also does not have any significant proportions on metallic iron or of iron-containing alloys in particulate form. The proportion of particles consisting essentially of iron or iron-containing alloys in particulate form is preferably below the detection limit.

Inventive transition metal carbonates have good processability to mixed transition metal oxides which can be used for production of electrodes of lithium ion batteries. The present invention further provides for the use of inventive transition metal carbonates for production of mixed transition metal oxides. The present invention further provides a process for preparing mixed transition metal oxides using inventive transition metal carbonates.

The procedure for preparation of mixed transition metal oxides may be to thermally treat a mixture of at least one inventive transition metal carbonate and at least one lithium compound at temperatures in the range from 600 to 1000° C.

Suitable lithium compounds are, for example, organometallic and preferably inorganic lithium compounds. Particularly preferred inorganic lithium compounds are selected from LiOH, $Li_2CO_3$, $Li_2O$ and $LiNO_3$ and corresponding hydrates, for example $LiOH.H_2O$. The procedure for the mixing may, for example, be to mix inventive transition metal carbonate with lithium compound in a solids mixer.

In one embodiment of the present invention, the stoichiometry of mixed transition metal oxide is set in the mixture of inventive transition metal carbonate and lithium compound, specifically in such a way that the molar ratio of lithium to the sum of the transition metals is in the range from 0.9 to 1.6, preferably from 1 to 1.25 and more preferably to 1.1. In another embodiment, the stoichiometry is set such that the molar ratio of lithium to the sum of the transition metals is about 0.5; for example, it may be in the range from 0.4 to 0.6.

Mixed transition metal oxides prepared in accordance with the invention have very good processability, for example due to their good free flow, and exhibit good cycling stability when electrochemical cells are produced using mixed transition metal oxide prepared in accordance with the invention.

The procedure for production of inventive electrodes may be to first process mixed transition metal oxide to electrode material.

Electrode material may, in addition to mixed transition metal oxide, further comprise carbon in an electrically conductive polymorph, for example in the form of carbon black, graphite, graphene, carbon nanotubes or activated carbon.

The electrode material may further comprise at least one binder, for example a polymeric binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene and copolymers of at least two comonomers selected from ethylene, propylene, styrene, (meth)acrylonitrile and 1,3-butadiene. Polypropylene is also suitable. Additionally suitable are polyisoprene and polyacrylates. Particular preference is given to polyacrylonitrile.

Polyacrylonitrile is understood in the context of the present invention to mean not only polyacrylonitrile homopolymers, but also copolymers of acrylonitrile with 1,3-butadiene or styrene. Preference is given to polyacrylonitrile homopolymers.

In the context of the present invention, polyethylene is understood to mean not only homopolyethylene but also copolymers of ethylene which comprise at least 50 mol % of ethylene in copolymerized form and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is understood to mean not only homopolypropylene but also copolymers of propylene which comprise at least 50 mol % of propylene in copolymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is understood to mean not only homopolymers of styrene but also copolymers with acrylonitrile, 1,3-butadiene, (meth) acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have a mean molecular weight $M_w$ in the range from 50 000 to 1 000 000 g/mol, preferably to 500 000 g/mol.

Binders may be crosslinked or uncrosslinked (co)polymers.

In a particularly preferred embodiment of the present invention, binder is selected from halogenated (co)polymers, especially from fluorinated (co)polymers. Halogenated and fluorinated (co)polymers are understood to mean those (co)polymers which comprise at least one (co)monomer having, respectively, at least one halogen atom and at least one fluorine atom per molecule in copolymerized form, preferably, respectively, at least two halogen atoms and at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Electrically conductive carbonaceous material can be selected, for example, from graphite, carbon black, carbon nanotubes, graphene or mixtures of at least two of the aforementioned substances. In the context of the present invention, electrically conductive carbonaceous material can also be referred to as carbon (B) for short.

In one embodiment of the present invention, the electrically conductive carbonaceous material is carbon black. Carbon black can be selected, for example, from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities in carbon black are possible.

In one variant, electrically conductive carbonaceous material is partially oxidized carbon black.

In one embodiment of the present invention, electrically conductive carbonaceous material comprises carbon nanotubes. Carbon nanotubes (CNTs for short), for example single-wall carbon nanotubes (SW CNTs) and preferably multiwall carbon nanotubes (MW CNTs), are known per se. A process for production thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be produced by processes known per se. For example, a volatile carbonaceous compound, for example methane or carbon monoxide, acetylene or ethylene, or a mixture of volatile carbonaceous compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, within the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbonaceous compounds in a light arc, and in the presence or absence of a decomposition catalyst.

In one embodiment, the decomposition of volatile or nonvolatile carbonaceous compound is performed in the presence of a decomposition catalyst, for example Fe, Co or preferably Ni.

Graphene is understood in the context of the present invention to mean almost ideally or ideally two-dimensional hexagonal carbon crystals of analogous structure to individual graphite layers.

In one embodiment of the present invention, the weight ratio of inventive modified mixed transition metal oxide and electrically conductive carbonaceous material is in the range from 200:1 to 5:1, preferably 100:1 to 10:1.

A further aspect of the present invention is an electrode comprising at least one mixed transition metal oxide prepared as above, at least one electrically conductive carbonaceous material and at least one binder.

Mixed transition metal oxide and electrically conductive carbonaceous material have been described above.

The present invention further provides electrochemical cells produced using at least one inventive electrode. The present invention further provides electrochemical cells comprising at least one inventive electrode.

In one embodiment of the present invention, the electrode material produced in accordance with the invention comprises:
in the range from 60 to 98% by weight, preferably 70 to 96% by weight, of mixed transition metal oxide,
in the range from 1 to 20% by weight, preferably 2 to 15% by weight, of binder,
in the range from 1 to 25% by weight, preferably 2 to 20% by weight, of electrically conductive carbonaceous material.

The geometry of inventive electrodes can be selected within wide limits. It is preferable to configure inventive electrodes in thin films, for example in films with a thickness in the range from 10 μm to 250 μm, preferably 20 to 130 μm.

In one embodiment of the present invention, inventive electrodes comprise a foil, for example a metal foil, especially an aluminum foil, or a polymer film, for example a polyester film, which may be untreated or siliconized.

The present invention further provides for the use of inventive electrode materials or inventive electrodes in electrochemical cells. The present invention further provides a process for producing electrochemical cells using inventive electrode material or inventive electrodes. The present invention further provides electrochemical cells comprising at least one inventive electrode material or at least one inventive electrode.

Inventive electrodes in inventive electrochemical cells serve by definition as cathodes. Inventive electrochemical cells comprise a counterelectrode, which is defined in the context of the present invention as the anode and which may be, for example, a carbon anode, especially a graphite anode, a lithium anode, a silicon anode or a lithium titanate anode.

The inventive electrochemical cells may, for example, be batteries or accumulators.

Inventive electrochemical cells may, as well as anode and inventive electrode, comprise further constituents, for example conductive salt, nonaqueous solvent, separator, output conductor, for example composed of a metal or an alloy, and also cable connections and housing.

In one embodiment of the present invention, inventive electrical cells comprise at least one nonaqueous solvent which may be liquid or solid at room temperature, preferably selected from polymers, cyclic and noncyclic ethers, cyclic and noncyclic acetals and cyclic and noncyclic organic carbonates.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (II) and (III)

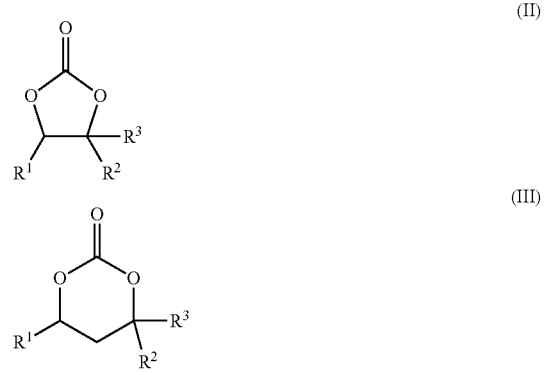

in which $R^1$, $R^2$ and $R^3$ may be the same or different and are selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

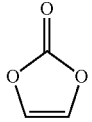

(IV)

The solvent(s) is (are) preferably used in what is known as the anhydrous state, i.e. with a water content in the range from 1 ppm to 0.1% by weight, determinable, for example, by Karl Fischer titration.

Inventive electrochemical cells further comprise at least one conductive salt. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_tYLi$, where m is defined as follows:
t=1 when Y is selected from oxygen and sulfur,
t=2 when Y is selected from nitrogen and phosphorus, and
t=3 when Y is selected from carbon and silicon.

Preferred conductive salts are selected from $LiC(CF_3SO_2)_3$, $LiN(CF_3SO_2)_2$, $LiPF_6$, $LiBF_4$, $LiClO_4$, and particular preference is given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, it is possible to select separators from PET nonwovens filled with inorganic particles. Such separators may have a porosity in the range from 40 to 55%. Suitable pore diameters are, for example, in the range from 80 to 750 nm.

Inventive electrochemical cells further comprise a housing which may have any desired shape, for example cuboidal or the shape of a cylindrical sheet. In one variant, the housing used is a metal foil elaborated as a pouch.

Inventive electrochemical cells deliver a high voltage and are notable for a high energy density and good stability.

Inventive electrochemical cells can be combined with one another, for example in series connection or in parallel connection. Series connection is preferred.

The present invention further provides for the use of inventive electrochemical cells in devices, especially in mobile devices. Examples of mobile devices are vehicles, for example automobiles, bicycles, aircraft, or water vehicles such as boats or ships. Other examples of mobile devices are those which are moved manually, for example computers, especially laptops, telephones, or power tools, for example from the building sector, especially drills, battery-powered drills or battery-powered tackers.

The use of inventive electrochemical cells in units gives the advantage of a longer run time before recharging. If it were desired to achieve an equal run time with electrochemical cells with lower energy density, a higher weight would have to be accepted for electrochemical cells.

The invention claimed is:

1. A process, comprising:
combining, in a stirred vessel, an aqueous solution of a transition metal salt with an aqueous solution of an alkali metal carbonate, alkali metal hydrogencarbonate, or any combination thereof, thereby obtaining an aqueous suspension of transition metal carbonate,
withdrawing a volume of the suspension from the stirred vessel and supplying the volume to a further compartment.
in the further compartment, continuously introducing a mechanical power of from 50 to 10 000 W/l in each case, based on the volume of the suspension in the further compartment, and then
recycling the volume of the suspension from the further compartment back into the stirred vessel,
thereby obtaining a transition metal carbonate with a mean particle diameter D50 of from 6 to 19 μm.

2. The process according to claim 1, wherein a transition metal of the transition metal salt and the transition metal carbonate is Cr, V, Mn, Ni, Fe, Co, Zn, Ti, Zr, or any mixture thereof, optionally with alkali metal, aluminum, or magnesium.

3. The process according to claim 1, wherein the transition metal carbonate, in addition to transition metal ions and carbonate ions, further comprises alkali metal ions and hydroxide ions.

4. The process according to claim 1, comprising introducing an overall mean power of from 2 to 35 W/l, based on overall suspension.

5. The process according to claim 1, wherein the further compartment is a pump, an insert, a mixing unit, a wet mill, a stirred tank, a homogenizer, or any combination thereof.

6. The process according to claim 1. wherein the further compartment is connected to the stirred vessel via a pumped circulation system.

7. The process according to claim 1, wherein a mean solids content of the suspension is from 70 to 1000 g/l.

8. The process according to claim 1, wherein a transition metal of the transition metal salt and the transition metal carbonate is selected from mixtures of Ni, Mn, and Co, optionally with an alkali metal, aluminum, magnesium, or any combination thereof.

9. The process according to claim 1, further comprising removing precipitated transition metal carbonate from a mother liquor.

10. The process according to claim 1, further comprising removing precipitated transition metal carbonate particles with a diameter greater than 50 μm.

11. The process according to claim 1, further comprising removing precipitated transition metal carbonate particles with a diameter greater than 32 μm.

* * * * *